Figure 1:
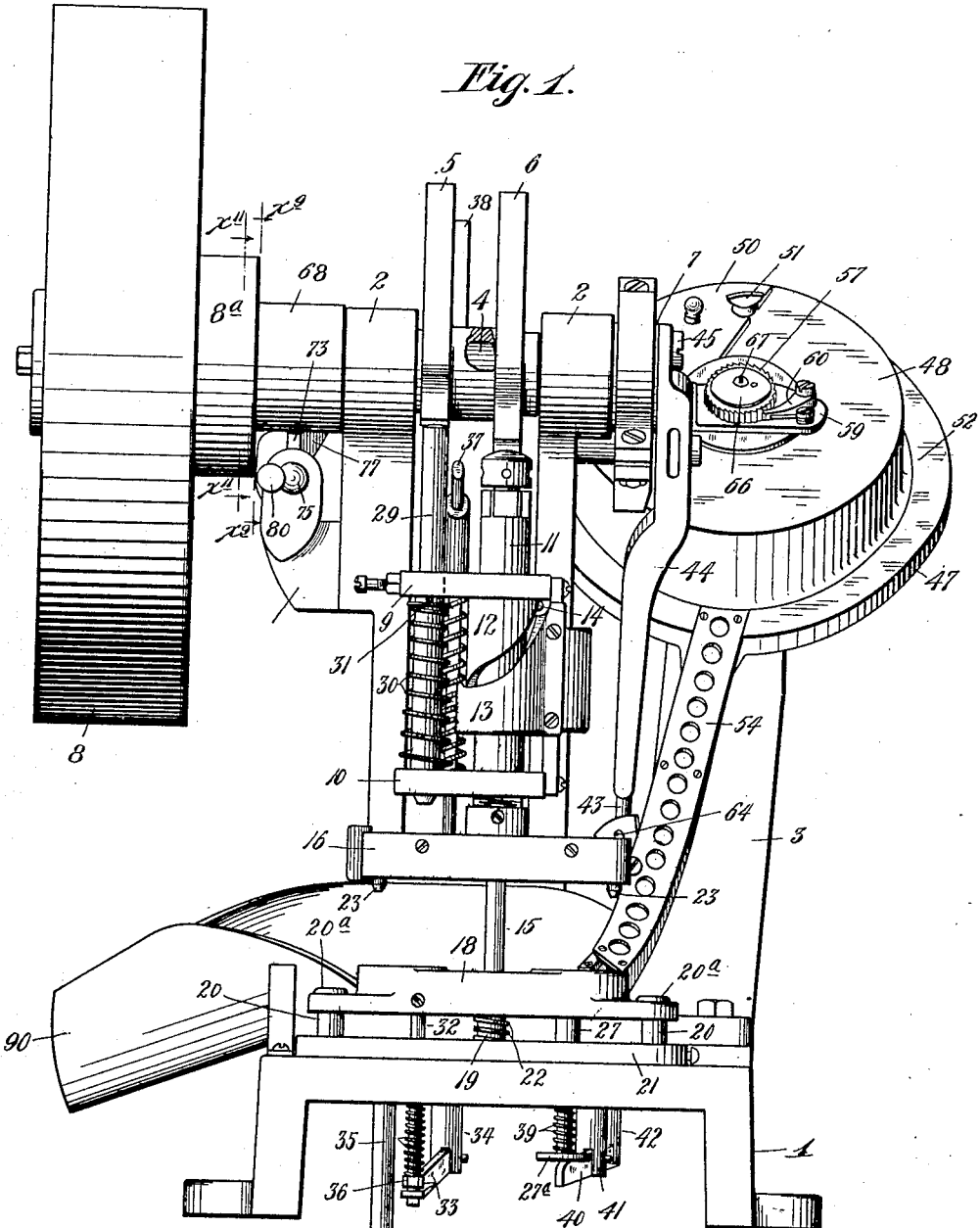

W. H. HARGRAVES.
BUTTON MACHINE.
APPLICATION FILED MAY 2, 1906.

912,674.

Patented Feb. 16, 1909.
5 SHEETS—SHEET 2.

Witnesses.
E. W. Jeppsen.
A. H. Opsahl.

Inventor.
William H. Hargraves.
By his Attorneys.
Williamson & Merchant

W. H. HARGRAVES.
BUTTON MACHINE.
APPLICATION FILED MAY 2, 1906.

912,674.

Patented Feb. 16, 1909.
5 SHEETS—SHEET 3.

Witnesses.
E. W. Jeppesen
A. H. Opsahl

Inventor:
William H. Hargraves.
By his Attorneys.
Williamson Merchant

W. H. HARGRAVES.
BUTTON MACHINE.
APPLICATION FILED MAY 2, 1906.

912,674.

Patented Feb. 16, 1909.
5 SHEETS—SHEET 4.

Witnesses.

Inventor.
William H. Hargrave
By his Attorneys

W. H. HARGRAVES.
BUTTON MACHINE.
APPLICATION FILED MAY 2, 1906.

912,674.

Patented Feb. 16, 1909.
5 SHEETS—SHEET 5.

Witnesses.
E. W. Jeppesen.
A. H. Opsahl.

Inventor:
William H. Hargraves.
By his Attorneys.
Williamson & Merchant

THE NORRIS PETERS CO., WASHINGTON, D. C.

UNITED STATES PATENT OFFICE.

WILLIAM H. HARGRAVES, OF ALLENTOWN, PENNSYLVANIA.

BUTTON-MACHINE.

No. 912,674.     Specification of Letters Patent.     Patented Feb. 16, 1909.

Application filed May 2, 1906. Serial No. 314,832.

*To all whom it may concern:*

Be it known that I, WILLIAM H. HARGRAVES, a citizen of the United States, residing at Allentown, in the county of Lehigh and State of Pennsylvania, have invented certain new and useful Improvements in Button-Machines; and I do hereby declare the following to be a full, clear, and exact description of the invention, such as will enable others skilled in the art to which it appertains to make and use the same.

My present invention relates to button machines of the character disclosed and claimed in my prior U. S. Letters Patent No. 791,094, issued to me of date May 30th, 1905. In the said prior machine means was provided for simultaneously applying a covering to the metallic shell of one button, and for applying a shank to an assembled shell and covering of another button; and means was also provided for automatically moving an assembled shell and covering, from an initial position, into the position where the shank was to be applied thereto. In the machine hereinafter described, and illustrated in the drawings, the mechanism for carrying out the operations above noted may be the same as those disclosed and claimed in my said prior patent; but the present machine is shown as a power-driven machine and the driving mechanism involves a "one revolution clutch" of novel construction.

In the prior machine, the three parts of the button, to-wit, the shell, the shank, and the covering, all had to be positioned in the dies, by a hand operation. In the present improved machine I provide means for automatically arighting, selecting, and positioning the shells of the buttons on or in line with the proper die. This feature is very desirable in the practical operation of the machine, because it reduces the necessary hand operations in number to two, which operations, to-wit, the positioning of the shank and covering, may be simultaneously performed by the use of two hands.

The present invention also involves other novel features of construction, which will be hereinafter described and defined in the claims.

Generally stated, the invention consists of the novel devices and combinations of devices hereinafter described and defined in the claims.

In the accompanying drawings, which illustrate the invention, like characters indicate like parts throughout the several views.

Figure 2:
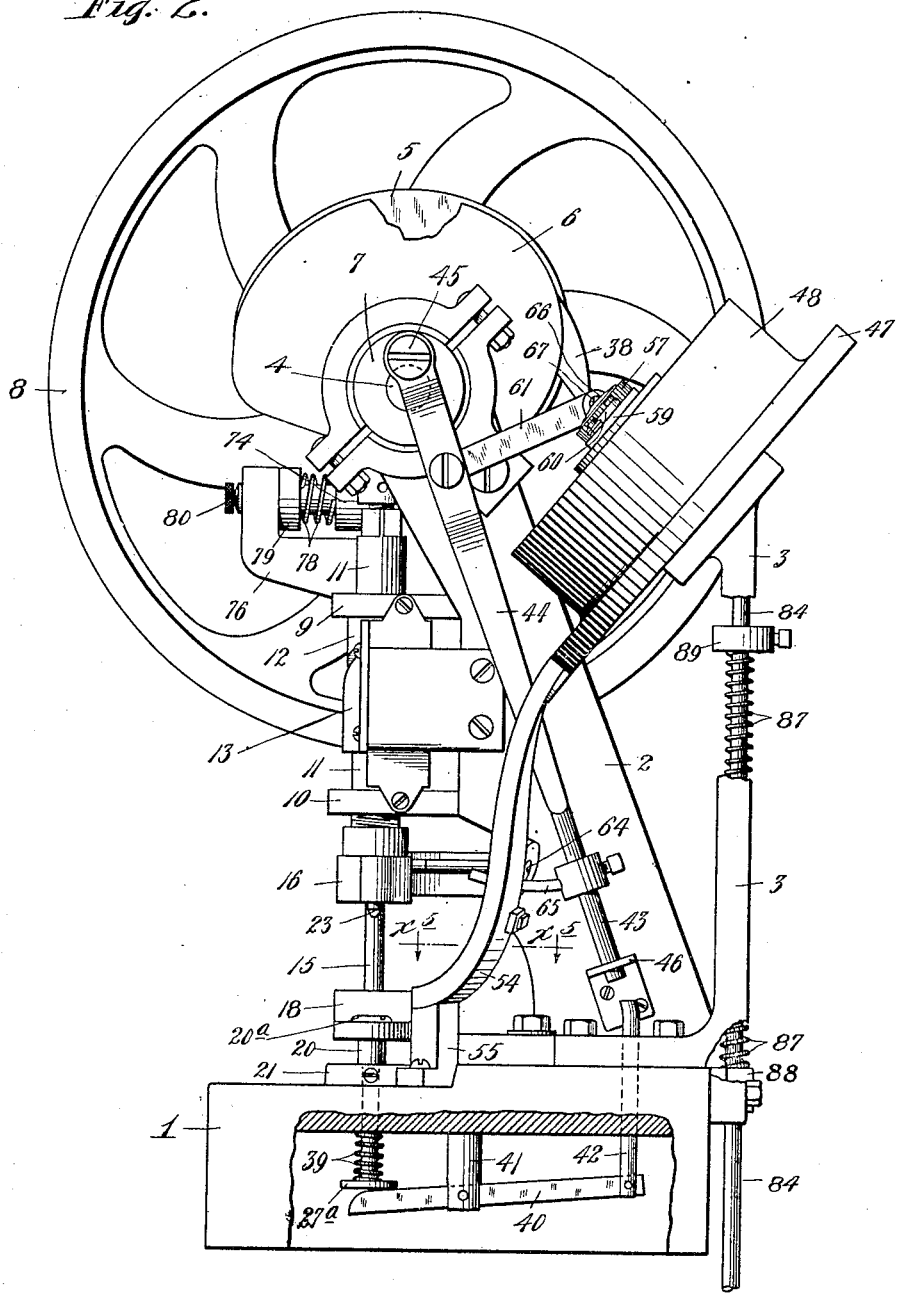
Figure 3:
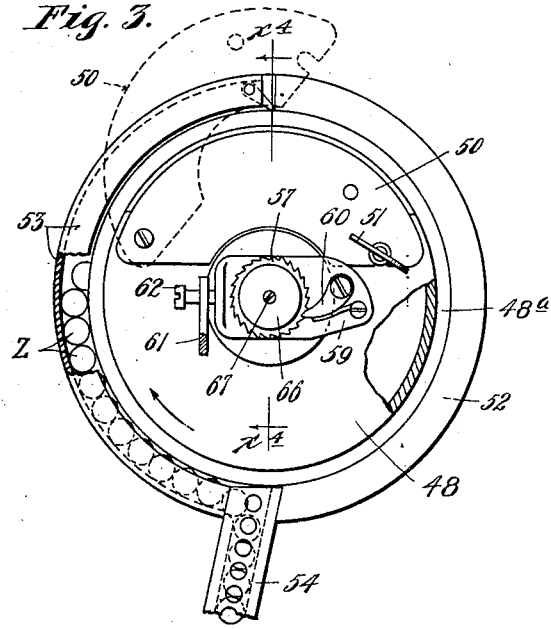
Figure 4:
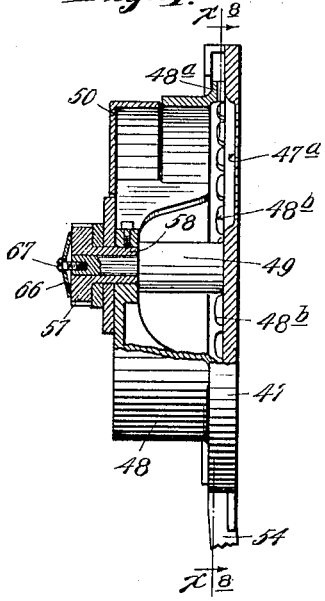
Figure 5:
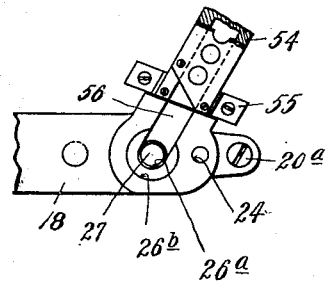
Figures 6, 7:
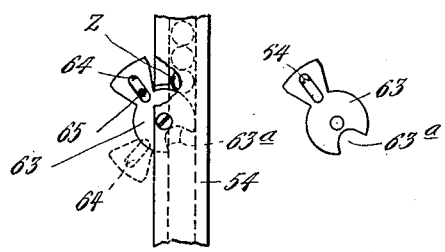
Figure 8:
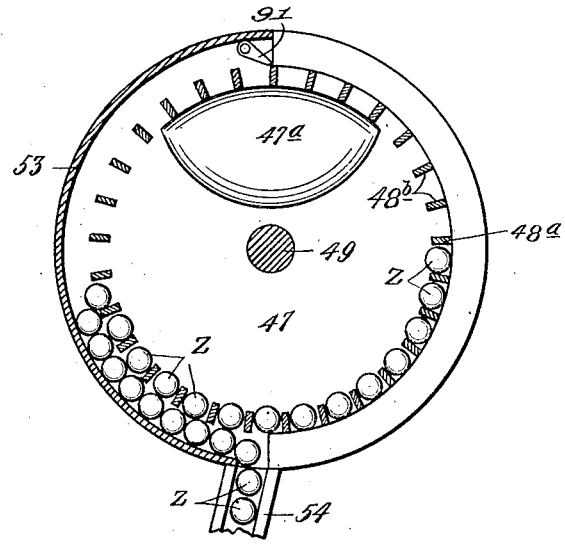
Figure 15:
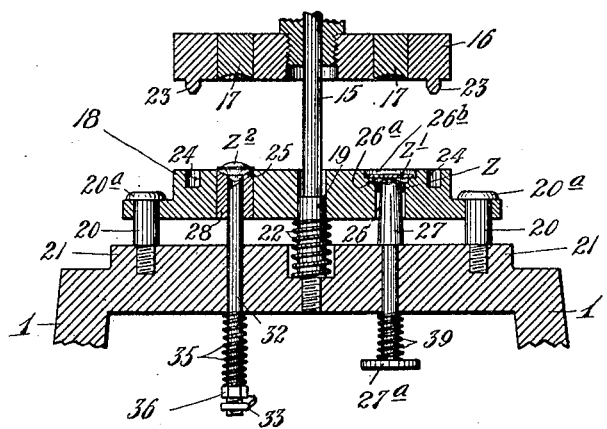
Figure 9:
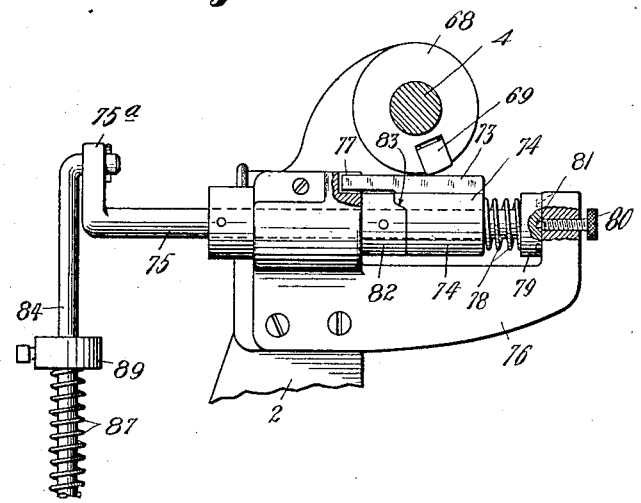
Figure 11:
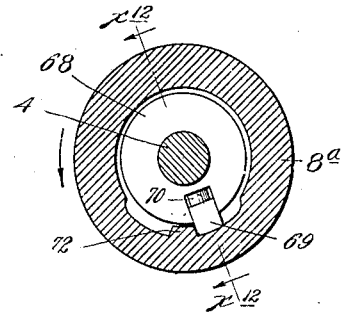
Figure 10:
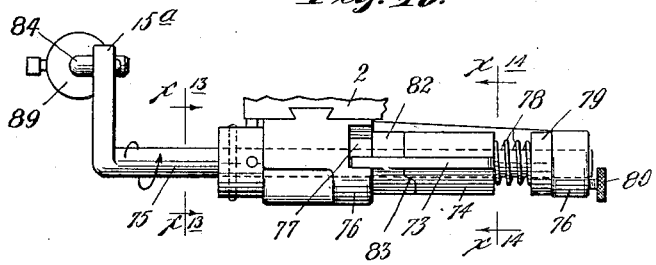
Figure 13:
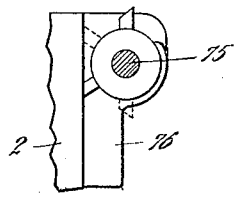
Figure 12:
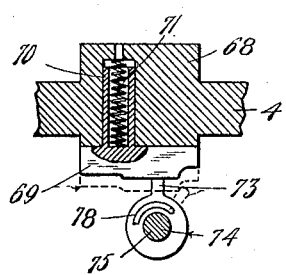
Figure 14:
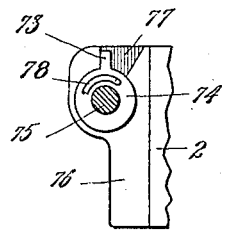

Figure 1 shows the improved machine in front elevation, some parts thereof being broken away. Fig. 2 shows the improved machine in right side elevation, some parts being broken away. Fig. 3 is a detail view with some parts broken away, showing the so-called "shell arighter and selector," looking directly at the face thereof. Fig. 4 is a section taken on the line $x^4$ $x^4$ of Fig. 3, some parts being left in full. Fig. 5 is a detail in horizontal section taken approximately on the line $x^5$ $x^5$ of Fig. 2. Fig. 6 is a detail view in elevation showing the intermediate portion of the shell-delivery chute or spout and an escapement dog which controls the discharge of the shells. Fig. 7 shows the shell-escapement dog in elevation. Fig. 8 is a section on the line $x^8$ $x^8$ of Fig. 4. Fig. 9 is a detail in section on the line $x^9$ $x^9$ of Fig. 1, some parts being broken away, showing the construction of the "one revolution clutch." Fig. 10 is a plan view of the parts shown in Fig. 9. Fig. 11 is a section taken on the line $x^{11}$ $x^{11}$ of Fig. 1. Fig. 12 is a section taken on the line $x^{12}$ $x^{12}$ of Fig. 11, some parts being removed, and showing also certain coöperating parts. Fig. 13 is a section taken on the line $x^{13}$ $x^{13}$ of Fig. 10, and Fig. 14 is a section taken on the line $x^{14}$ $x^{14}$ of Fig. 10. Fig. 15 is a vertical section through the die blocks.

Referring to the drawings, the numeral 1 indicates a recessed bed or base of the machine, to which is rigidly secured a bifurcated upright supporting pedestal 2 and an upright supporting bracket 3. A power shaft 4 is journaled in suitable bearings in the upper ends of the arms of the bifurcated pedestal 2. Between the arms of the pedestal 2 the shaft 4 carries a pair of cams 5 and 6, and at its right hand end, as viewed in Fig. 1, it carries an eccentric 7. On the left hand end of the driving shaft 4 is a loose pulley 8 that is preferably made heavy, so that it serves also as a fly wheel.

On the front side of the pedestal 2 are rigidly secured forwardly projecting horizontally disposed upper and lower bearing plates 9 and 10. In one side of the bearing plates 9 and 10 are vertically alined bearing apertures, through which reciprocates a vertically disposed die-carrying shaft 11. Rigidly secured to and between the bearing plates 9 and 10 are spiral cams 12 and 13 that coöperate with a cam pin 14 on the die shaft 11, to cause said shaft to move vertically downward and to make a half rotation when it is returned vertically upward, all as fully described in my said prior patent. The cam 6 acts upon the upper end of this die shaft 11, to force the same downward.

At its lower end the die-carrying shaft 11 is hollow and telescopes over a vertical rod 15, which rod is fixed at its lower end to the base 1. The die shaft 11 is yieldingly pressed upward, preferably by a coiled spring placed within the shaft 11 and compressed between the upper end of the rod 15 and the said shaft 11, as disclosed in the said prior patent, not herein shown. At its lower end the die-carrying shaft 11 is rigidly secured to an upper die-block 16. Mounted to move vertically in suitable seats in the end portions of the die-block 16, at points equidistant from the axis of the shaft 11, are upper or clenching members 17 of a coöperating set of dies, the other members of which will presently be described.

A lower non-rotary, but vertically movable, die-block 18 is located below the vertically movable intermittently rotated die-block 16. This lower die-block 18, at its central portion, has an aperture that receives a stud 19, and the ends thereof are apertured and work telescopically over headed studs 20; which studs, as shown, are rigidly secured to a machined boss 21 on the base 1. A coiled spring 22, which surrounds the central stud 19, yieldingly presses the die-block 19 upward, its upward movement being limited by the heads 20$^a$ of the studs 20.

The numeral 23 indicates dowel pins that are carried by the upper die-block 16 and engage seats 24 in the die-block 18 to accurately position said die-block 16 when forced downward against said die-block 18.

In the end portions of the lower die 18, equidistant from the axis of the die-carrying shaft 11, and in position to aline axially with the clenching dies 17 are die seats 25 and 26. The die seat 26, at its upper portion, is enlarged to form a seat 26$^a$ for one of the button shells $z$; and just above said enlargement 26$^a$ said seat is further enlarged at 26$^b$, to form a seat for a disk-like piece of cloth, or other material, $z^1$ that is to form the covering of the button.

Working vertically through a suitable seat in the raised portion of the base 1 is a so-called anvil-die 27, the upper end of which is preferably rounded to approximately fit the concavities of the shells $z$.

Mounted for limited sliding movements in the vertically extended seat 25, at the other end of the die-block 18, is a shank-receiving die 28 which is preferably cylindrical in form, and the upper end of which is shaped to receive the shank $z^2$ of the button which is to be formed.

In the bearing plates 9 and 10 and at one side of and adjacent to the die-carrying shaft 11, is mounted a vertically movable clenching plunger 29, the upper end of which is subject to the cam 5. A coiled spring 30 which surrounds said plunger reacts against the lower bearing plates 10 and a pin 31 on said plunger, and normally holds the said plunger in its extreme uppermost position, shown in Fig. 1.

A shank-ejecting pin or plunger 32 works vertically through the tubular shank-receiving die 28 and through a seat and the raised portion of the base 1, and is supported by the forward end of a lever 33, which lever is intermediately pivoted to a bearing 34 on the base 1. A coiled spring 35 on the lower portion of said ejecting-pin 32 reacts against the base 1 and against a nut 36 on said pin, to yieldingly hold said pin downward. The rear end of said lever 33 is pivotally connected to a vertically movable rod 37, which rod is mounted in suitable guides on the bearing pedestal 2 and the base 1, and at its upper end is subject to a laterally offset cam 38 shown as directly secured to and carried by the cam 5.

The plunger-die 27, before described, has a depending stem, and at the lower end of its depending stem it is preferably provided with a head 27$^a$, between which and the raised portion of the base 1 is compressed a coiled spring 39 that assists gravity to yieldingly hold said plunger downward, with its body portion seated against the base 1, as shown in Fig. 15. A lever 40, which is intermediately pivoted to a bearing 41 on the base 1, engages at its forward end with a head 27$^a$ of the plunger die 27. The rear end of said lever is pivotally connected to a vertically movable pin 42 that works through a suitable bearing in the base 1, and projects above the same. The upper end of the pin 42 is adapted to be engaged and depressed at the proper times, by the plunger-acting end 43 of a crank rod 44, the upper end of which is connected to a crank pin 45 carried by the eccentric 7 of the shaft 4. The said plunger-acting lower end 43 of said crank rod works freely through a bearing 46 on the pedestal 2, as best shown in Fig. 2.

The shell-arighting and selecting device comprises a shell-holding receptacle made up of a fixed disk-like bottom plate 47 and an inverted cap-like rotary hopper 48, which hopper is journaled for rotary movements, on a stud 49 that is centrally secured to the bottom plate 47. Said bottom plate 47 stands in an inclined position of about 45 degrees to a perpendicular, and is rigidly secured to the upper end of the bearing arm 3. The hopper 48 has a segmental door 50 that is hinged thereto at one end, and is adapted to be locked thereto, at its other end, by a thumb screw 51. This door, when opened, permits the shells z to be inserted into the receptacle made up of the inclined plate 47 and hopper 48. The bottom plate 47 is formed with a solid segmental flange 52 and with a channeled segmental flange 53, each of which extends to about 180 degrees and the two of which surrounds the flanged base 48$^a$ of the said rotary hopper 48. The channel in the said segmental flange 53 is of the proper size to afford the upper portion of a delivery chute for directing the shells from the combined arighter and selector to the shell-receiving seat 26$^a$ of the fixed die-block 18. The lower portion of this delivery chute is afforded by an inclined and preferably slightly curved spout 54, the upper end of which is rigidly secured to the bottom plate 47, and the lower end of which is rigidly secured, as shown, to a bearing-block 55, rigidly secured on the base 1 adjacent to the shell-seat 26 of the die-block 18. The die-block 18 is formed with a slot 56 (see Fig. 5,) which is of the proper size and is properly positioned to direct the shells z from the lower end of the spout 54 into the shell-seat 26$^a$ and directly over the upper end of the plunger-die 27. The channel in the flange 53 is, of course, arranged to deliver the shells z directly into the upper end of the spout 54, as best shown in Fig. 3.

The flanged base 48$^a$ of the rotary hopper 48 is formed with notches 48$^b$ that are of the same form as the vertical cross section or profile of the shells z, and are of such size and are so arranged that they will permit the said shells, under the action of gravity, to slide therethrough into the channel of the flange 53, when and only when the said shells are positioned with their edges resting upon the inclined bottom-plate 47. In the upper portion of the bottom plate 47 is a depression 47$^a$, the lower edge of which is rounded, all for a purpose which will hereinafter appear.

An intermittent step by step rotary movement in a constant direction is imparted to the rotary hopper 48 and to this end a ratchet wheel 57 that is secured to the rotary hopper 48 by a sleeve 58, a plate-like pawl-carrying lever 59 is pivoted on the sleeve 58, and at one end carries a spring-pressed driving pawl 60 that engages the teeth of the ratchet wheel 57. A short link 61 (see Figs. 2 and 3) is attached at one end to the crank rod 44, and at its other end is loosely pivoted by means of screws 62 to that end of the pawl lever 59 that is opposite to the pawl 60.

The discharge of the shells z from the lower end of the spout 54 is controlled by an escapement dog 63 that is pivoted to said spout and works in a suitable slot therein, as best shown in Figs. 2, 6 and 7. A projecting arm of the pawl 63 is provided with a slot 64, in which works a finger 65 that is carried by the lower end of the crank-rod 44, as best shown in Fig. 2.

When the pawl 63 is in the position shown by full lines in Fig. 6 it holds back the shells z contained in the upper portion of the spout 54, but when turned into the position shown by dotted lines a shell will drop into the notch 63$^a$ of said pawl; and when the said pawl is then moved back to the said full-line position, the said shell will be dropped into the lower portion of said spout, and from thence will run into the shell-seat 26$^a$ of the die-block 18.

The rotary-hopper 48 is frictionally held or is put under friction preventing accidental rotation thereof, as shown, by means of a spring washer 66 that bears against the face of the ratchet wheel 57, and is secured to the fixed stud 49 by means of a screw 67, or other suitable devices.

The construction of the one revolution clutch is best shown in Figs. 9 to 14 inclusive. Rigidly secured to the shaft 4 adjacent to the hub 8$^a$ of the fly-wheel 8, and extending into a recess in the said hub 8$^a$, is a collar 68, which collar is slotted to receive a radially movable driving key 69. This driving key 69 has a tubular sleeve 70 that works telescopically in the radial seat of said collar 68. Within the sleeve 70 is a spring 71 that yieldingly forces the said driving key 69 radially outward. The wheel-hub 8$^a$, within its recess, is provided with an internal driving lug or key 72 that is adapted to engage the driving-key 69 to cause the shaft 4, and parts carried thereby, to rotate with the said fly-wheel. Normally, the key 69 is engaged and pressed inward, by the tripping flange 73 of a sleeve 74, which sleeve is loosely mounted on a tripping-rod 75, which in turn is loosely mounted in a bearing-bracket 76 rigidly secured to one arm of the bearing-pedestal 2. At one end the tripping flange 73 is extended in the form of a finger and works in a segmental notch 77, formed in one of the bearings of the bracket 76. The segmental slot 77 limits the movements of the loose sleeve 74 and tripping-flange 73, but permits the same to move from the operative position shown by full lines in Figs. 9, 10, 12 and 14 into the inoperative position shown by dotted lines in Fig. 12. A coiled torsional spring 78 attached at one end to the sleeve 74 and at its other end to an anchored collar 79 yieldingly holds said sleeve and its tripping-flange in the operative position shown. The tension of the spring 78 may be varied by rotary adjustments of the collar 79, and the said collar will be locked in any one of several positions by means of a setscrew 80 that works through the outer bearing of the bracket 76 and engages one or the other of several notches or seats 81. The spring 78 also permits sliding movements of the sleeve 74. Rigidly secured to the trip-rod 75 is another sleeve 82; the abutting ends of the sleeves 74 and 82 engage each other and have coöperating beveled driving surfaces or cam portions 83, the pitch of which is such that when the trip-rod 75 is oscillated in the direction of the arrow marked thereon in Fig. 10, the sleeve 74 will also be oscillated against the tension of the spring 78, thereby carrying the tripping flange 73 into its inoperative position shown by dotted lines in Fig. 12, and permitting the key 69 to be thrown out into a position to be engaged by the driving-lug or key 72 of the fly-wheel hub 8ᵃ. By means presently described the tripping-rod or shaft 75 will be given a movement more than sufficient to throw the projecting end of the tripping-flange 73 against the other extremity of the segmental notch 77, whereby oscillatory movements of the sleeve 74 will be stopped and the engaging cam surfaces 83 will then force the sleeve 74 endwise and bring the most extended portions of the abutting ends of the sleeves 74 and 82 into engagement; whereupon the spring 78 becomes effective to return the sleeve 74 and its tripping-flange 73 to normal position, in advance of the return movement of the tripping-rod or shaft 75. Thus it will be seen that the tripping-flange 73 is first thrown into the dotted line position shown in Fig. 12, to allow the key 69 to be thrown out of position to be engaged by the driving-lug or key 72 of the fly-wheel hub, and immediately after the rotation of the shaft 4 has begun and the key 69 has been rotated out of engagement with the said tripping-flange, the said tripping-flange is quickly returned to normal or operative position, so that it will positively cam the said key 69 out of engagement with the said driving-lug or key 72, when the rotation of said shaft 4 has been completed.

As a convenient means for imparting the rocking movement to the tripping-rod or shaft 75, necessary to throw the clutch into action, said shaft is provided with a projecting crank-arm 75ᵃ, to which is attached the upper end of a vertical rod 84; to the lower end of which rod is attached a foot lever 85, shown as pivoted to a bearing 86 on the floor, or other suitable support. A coiled spring 87 on the rod 84 reacts against a bearing 88 on the base 1 and a collar 89 on said rod, and serves to press the said rod upward and return the trip-rod or shaft 75 and sleeve 82 to normal position.

The numeral 90 indicates a discharge spout which is secured to the base 1, in position to receive the finished buttons.

Operation: The operation, briefly summarized, is as follows: We will assume that a button shell $z$ is placed in position over the anvil-die 27, in the seat 26ᵃ; that a covering $z^1$ is placed over the said cap in the seat 26ᵇ; and that shank $z^2$ is placed at the left in the seat 25, resting upon the tubular die 28, as shown in Fig. 15. We will further assume that by a previous operation of the machine a shell and covering is positioned in the left-hand die-seat of the rotary die-block 16, and is positioned directly over the shank $z^2$. The shaft 4 and the cams 5 and 6, and other parts carried thereby, should then be given one complete rotation, by means of the one revolution clutch described. This being done, the cam 6 first comes into action on the upper end of the die-carrying shaft 11 and forces the die 16, first against the die-block 18, and then forces the two die-blocks, while in contact, downward until the said die-block 18 rests firmly upon the raised boss 21 of the base 1. At about this time the clenching-plunger 29 is thrown downward by the cam 5, and its lower end engages and presses downward the die 17, which is then located at the left; and the said die, by its downward movement, forces the assembled shell and covering onto the positioned shank; and the said covering, shell and shank are clenched together, by the coöperating dies 17 and 28. Approximately simultaneously with the above noted downward movement of the clenching-plunger, the lower end of the crank-rod 44 engages the upper end of the vertically-movable pin 42, thereby forcing the same downward and causing the lever 44 to force the anvil-die 27 upward. This upward movement of the anvil-die 27 forces the shell $z$ and covering $z^1$ together into the die-seat of the die-block 16, which is then positioned at the right. The above noted downward movement of the die-block 18, together with the die-block 16, also assists in forcing the shell and covering into the overlying die-seat of the die-block 16. After the cams 5 and 6 have been moved far enough to permit the clenching-plunger 29 to return to normal position, or nearly to normal position, and the shaft 11 and die-block 16 to rise part way to normal position, a supplemental cam 38 comes into action on the rod 37, forcing the same downward and causing the lever 33 to raise the ejecting pin 32, and thereby force the completed button out of its seat in the die-block 18 and into the discharge spout 90. When the die-carrying shaft 11 is moved upward, the said shaft and die-block are given a one-half rotation, under the action of the cam 12 and the cam pin 14, which parts have already been briefly described and are, as before stated, more fully set forth in my prior patent above noted. This half rotation of the die-block 16, as is evident, serves to carry the cap $z$ and covering $z^1$ which were forced into the die-seat of said die-block from the right to the left, to-wit, from a position over the anvil-die 27 into a position directly over the clenching-plunger 28.

Under each complete movement of the crank-rod 44, the cap-escapement dog 63 is oscillated back and forth and caused to discharge the lowermost of the shells contained in the spout 54. The discharging movement of the said escapement dogs takes place under an upward movement of the said crank-rod and while the die-block 16 is making its upward movement, but after the said die-block is moved far enough to permit the lower die-block 18 to move upward or back to normal position. Also, as before indicated, the rotary hopper 48 of the shell-arighting and selecting device is given one step of rotary movement, in the direction of the arrow marked thereon in Fig. 3, under each complete reciprocation of the crank-rod 44.

Under the rotary movement of the hopper 48 the shells are kept stirred up, and are carried upward and then dropped or permitted to slide downward over the smooth surface of the bottom plate 47. Whenever one of the shells $z$, the edge of which rides upon the inclined plate 47, comes into engagement with one of the notches $48^b$ in the flanged edge of the rotary hopper 48, it passes through the same into the segmental channel of the flange 53. Under this action more of the shells $z$ will be caused to enter the segmental upper section 53 of the delivery-chute than required to afford the supply to the assembling-dies. Hence, some of these shells will be carried upward and dropped back into the interior of the rotary hopper 48. At the extreme upper end of the segmental section 53 of the supply-chute is a cam finger 91 which serves to positively force the surplus shells from the said chute section 53, back into the interior of the hopper 48. The depression $47^a$ in the upper portion of the bottom plate 47 also assists in insuring the discharge of surplus shells from the chute section 53.

Under the rotation of the hopper 48 the shells contained in bulk therein will be stirred up, and those that rest with rounded heads on the plate 47 will ultimately be turned over and properly presented to the selecting notches $47^a$. The depression $48^a$ also serves to cause the shells to roll over in sliding down over the said plate.

The machine above described has in practice been found highly efficient for the purposes had in view.

I claim as my invention:

1. A button assembling machine, comprising a base, a main shaft, a yielding die block mounted on the base and having a seat for the button covering, a vertically movable anvil die mounted on the base and working through said seat, a reciprocating upper die block actuated from said main shaft, a rod reciprocated from the main shaft, a vertically reciprocating rod in the path of the lower end of said first named rod, and a lever engaging the said anvil die and actuated by said reciprocating rod to raise the anvil die when the die blocks are forced together.

2. A button assembling machine comprising a main shaft, a yielding die block having a seat for the button covering, a vertically movable anvil die working through said seat, a reciprocating rod connected with the main shaft, connections between said rod and the anvil die, a feed mechanism including a chute leading to said die seat, means for controlling the feed of blanks through the chute, operative connections between said controlling means and said reciprocating rod, and an upper reciprocating die block actuated from said main shaft.

3. A button assembling machine comprising a main shaft, a lower yielding die block, having a seat for the button cover, an anvil working through said seat, an operating lever engaging said anvil, an upper die block, means for imparting a reciprocating movement thereto, a reciprocating rod actuated from the main shaft and in turn actuating said anvil operating lever when the die blocks are brought together, a feed mechanism including a hopper, operative connections between said reciprocating rod and hopper, a stationary feed chute leading from the hopper to the shell seat in said yielding die block, a controlling device in the chute and means carried by said reciprocating rod for actuating said controlling device to supply a shell to the said seat when the lower die block is in its raised position.

4. A button assembling machine comprising a base, a main shaft provided with three cams, a lower yielding die block mounted on the base and having a shank die provided with an ejector operated from one of said cams, and a shell receiving aperture having an annular seat, a reciprocating shell anvil projecting from the base through said shell aperture, a rotary reciprocating upper die block actuated from another of said cams, a clenching die on said upper die block actuated from another of said cams, and operative connections between the main shaft and the shell anvil to raise said anvil when the upper die block has depressed the lower die block.

In testimony whereof I affix my signature in presence of two witnesses.

WILLIAM H. HARGRAVES.

Witnesses:
 WALTER L. WATSON,
 GWENNIE P. PIPER.